US010626943B2

(12) United States Patent
Namiki et al.

(10) Patent No.: US 10,626,943 B2
(45) Date of Patent: Apr. 21, 2020

(54) GROMMET

(71) Applicant: Yazaki Corporation, Minato-ku, Tokyo (JP)

(72) Inventors: Shintaro Namiki, Susono (JP); Satoshi Uematsu, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 16/219,020

(22) Filed: Dec. 13, 2018

(65) Prior Publication Data
US 2019/0186574 A1 Jun. 20, 2019

(30) Foreign Application Priority Data

Dec. 15, 2017 (JP) .................................. 2017-240327

(51) Int. Cl.
*F16L 5/00* (2006.01)
*F16F 1/373* (2006.01)
(Continued)

(52) U.S. Cl.
CPC ........ *F16F 1/3732* (2013.01); *B60R 16/0222* (2013.01); *F16B 43/02* (2013.01)

(58) Field of Classification Search
CPC ... Y10T 16/05; Y10T 16/063; B60R 16/0222; B60R 16/0207; B60R 16/0215; H02G 3/22; H02G 3/0468; H02G 3/0481; H02G 15/013; F16L 5/10; F16B 5/0258; F16B 43/001; F16B 43/02; F16B 5/126; F16B 5/0651; F16B 37/043; H01R 13/5205; H01R 13/5208; H01B 17/24; H01B 17/583; F16F 1/3732
See application file for complete search history.

(56) References Cited

U.S. PATENT DOCUMENTS 4,385,777 A * 5/1983 Logsdon .................... F16L 5/10
16/2.1
4,839,937 A * 6/1989 Oikawa ...................... F16L 5/02
16/2.1
(Continued)

FOREIGN PATENT DOCUMENTS

| JP | H04-121616 U | 10/1992 |
| JP | 2003-070133 A | 3/2003 |
| JP | 2005-073349 A | 3/2005 |

*Primary Examiner* — Chuck Y Mah
(74) *Attorney, Agent, or Firm* — Banner & Witcoff, Ltd.

(57) ABSTRACT

A grommet is formed by integrally fitting a substantially annular flange of a grommet interior to a substantially annular flange fitting groove of a grommet exterior. The grommet exterior includes a large-diameter cylindrical portion in which the flange fitting groove is formed inside, an anti-rotation rib that projects from the flange fitting groove toward inside of the large-diameter cylindrical portion, and a first reduced-diameter cylindrical portion that is provided on an attachment side of the grommet interior to the large-diameter cylindrical portion and that has a diameter smaller than that of the large-diameter cylindrical portion. The flange of the grommet interior is provided with a notch portion into which the anti-rotation rib is fitted. Further, the first reduced-diameter cylindrical portion includes a protrusion on the outer surface thereof that indicates the position of the anti-rotation rib.

5 Claims, 9 Drawing Sheets

THE OTHER SIDE     ONE SIDE

(51) Int. Cl.
*B60R 16/02* (2006.01)
*F16B 43/02* (2006.01)

(56) References Cited

U.S. PATENT DOCUMENTS

| | | | | |
|---|---|---|---|---|
| 4,923,347 | A * | 5/1990 | Moryl | F16B 37/044 |
| | | | | 411/182 |
| 5,144,777 | A * | 9/1992 | Fishel | A47B 21/06 |
| | | | | 16/2.1 |
| 5,545,854 | A * | 8/1996 | Ishida | H02G 3/081 |
| | | | | 16/2.2 |
| 5,606,784 | A * | 3/1997 | Hamamoto | B60N 2/015 |
| | | | | 24/580.1 |
| 5,806,139 | A * | 9/1998 | Anderson | B60R 16/0222 |
| | | | | 16/2.1 |
| 6,364,586 | B1 * | 4/2002 | Okada | F16B 19/1081 |
| | | | | 411/41 |
| 6,553,615 | B1 * | 4/2003 | Hansen | F16B 5/0241 |
| | | | | 16/2.1 |
| 7,895,709 | B2 * | 3/2011 | Shishikura | B60R 13/04 |
| | | | | 16/2.1 |
| 9,365,170 | B2 * | 6/2016 | Gronowicz, Jr. | B60R 16/0222 |
| 2004/0071527 | A1 * | 4/2004 | Dendo | F16B 5/0258 |
| | | | | 411/508 |
| 2013/0149066 | A1 * | 6/2013 | Handa | F16B 19/10 |
| | | | | 411/57.1 |

* cited by examiner

THE OTHER SIDE ←→ ONE SIDE

THE OTHER SIDE ⟷ ONE SIDE

GROMMET

CROSS-REFERENCE TO RELATED APPLICATIONS

This application is based on and claims priority under 35 USC 119 from Japanese Patent Application No. 2017-240327 filed on Dec. 15, 2017, the contents of which are incorporated herein by reference.

TECHNICAL FIELD

The present invention relates to a grommet.

BACKGROUND ART

There is proposed a grommet in which a flange of a grommet interior and a flange fitting groove of a grommet exterior are integrally fitted. In order to prevent rotation of the grommet interior, the grommet includes a dent portion and a projecting portion in the flange and the flange fitting groove, so that the flange and the flange fitting groove are engaged.

PRIOR ART DOCUMENT

Patent Document

Patent Document 1: JP-A-2003-70133

SUMMARY OF INVENTION

However, in the grommet disclosed in Patent Document 1, an anti-rotation rib is hardly seen from outside of the grommet exterior when the anti-rotation rib is provided in the flange fitting groove. Accordingly, it is difficult to attach the grommet interior to the grommet exterior in a manner that a notch portion coincides with the anti-rotation rib.

The present invention is made to solve such a problem. An object of the present invention is to provide a grommet in which a notch portion formed in a flange can easily coincide with an anti-rotation rib provided inside a flange fitting groove when a grommet interior is attached to a grommet exterior.

A first aspect of the present invention provides a grommet in which a substantially annular flange of a grommet interior and a substantially annular flange fitting groove of a grommet exterior are integrally fitted. The grommet exterior includes a large-diameter cylindrical portion having the flange fitting groove inside thereof, an anti-rotation rib protruding from the flange fitting groove toward inside of the large-diameter cylindrical portion, and a reduced-diameter cylindrical portion that is provided on an attachment side of the grommet interior than the large-diameter cylindrical portion and that has a diameter smaller than that of the large-diameter cylindrical portion. The grommet interior includes, in the flange, a notch portion into which the anti-rotation rib is fitted. Further, the reduced-diameter cylindrical portion includes a mark portion for indicating the position of the anti-rotation rib on the outer surface thereof.

According to the present invention, the reduced-diameter cylindrical portion includes the mark portion indicating the position of the anti-rotation rib on the outer surface thereof. Therefore, even if the anti-rotation rib is provided at a position such as inside of the large-diameter cylindrical portion that is hardly seen, the mark portion is provided at a position that is easily recognized at a glance during attachment such as the outer surface of the reduced-diameter cylindrical portion in the grommet exterior that serves as an attachment side of the grommet interior. Therefore, the notch portion can easily coincides with the anti-rotation rib when the grommet interior is attached to the grommet exterior with reference to the mark portion.

DESCRIPTION OF EMBODIMENTS

Hereinafter, the present invention is described with reference to preferred embodiments. The present invention is not limited to the embodiments to be described below and may be appropriately changed without departing from the spirit of the present invention. In the embodiments to be described below, some configurations are not illustrated or described, but it goes without saying that a known or well-known technique is appropriately applied to details of an omitted technique within a range in which no contradiction occurs to contents to be described below.

Figure 1:
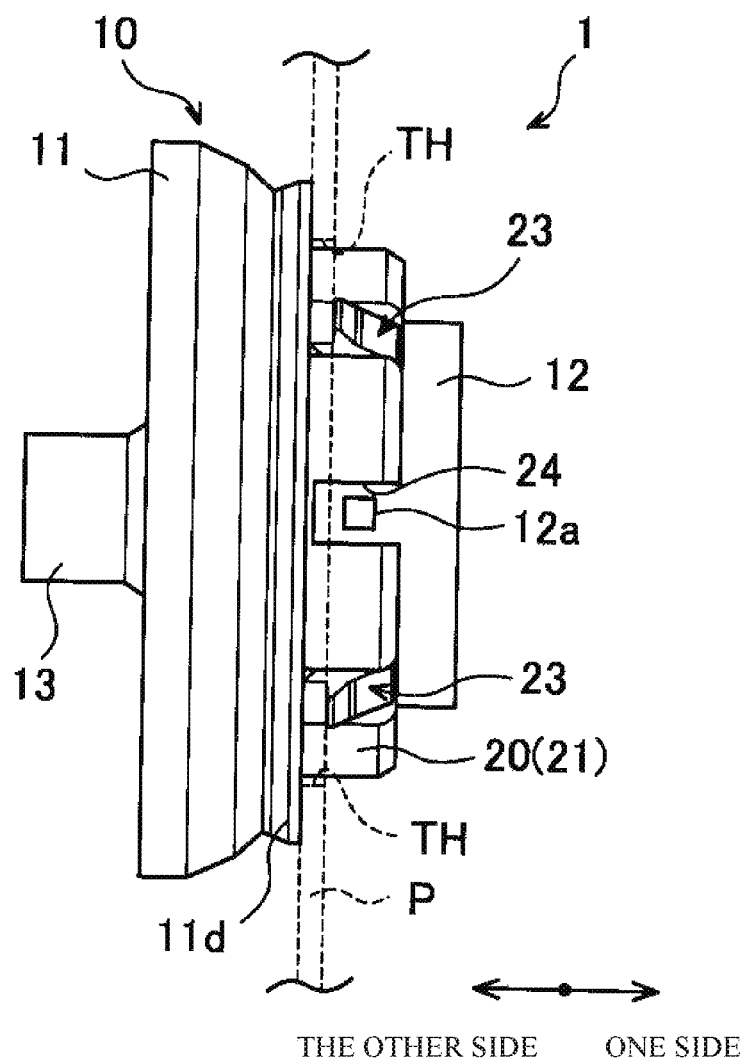
FIG. 1 is a side view illustrating a grommet according to a first embodiment.

FIG. 1 is a side view illustrating a grommet according to a first embodiment. A grommet 1 according to the first embodiment is inserted and fixed to a through hole TH formed in a panel P. The grommet 1 includes a soft grommet exterior 10 made of a rubber member and a hard grommet interior 20 made of a synthetic resin. The grommet interior 20 is integrally attached to the grommet exterior 10 from one side of the grommet exterior 10.

Figure 2:
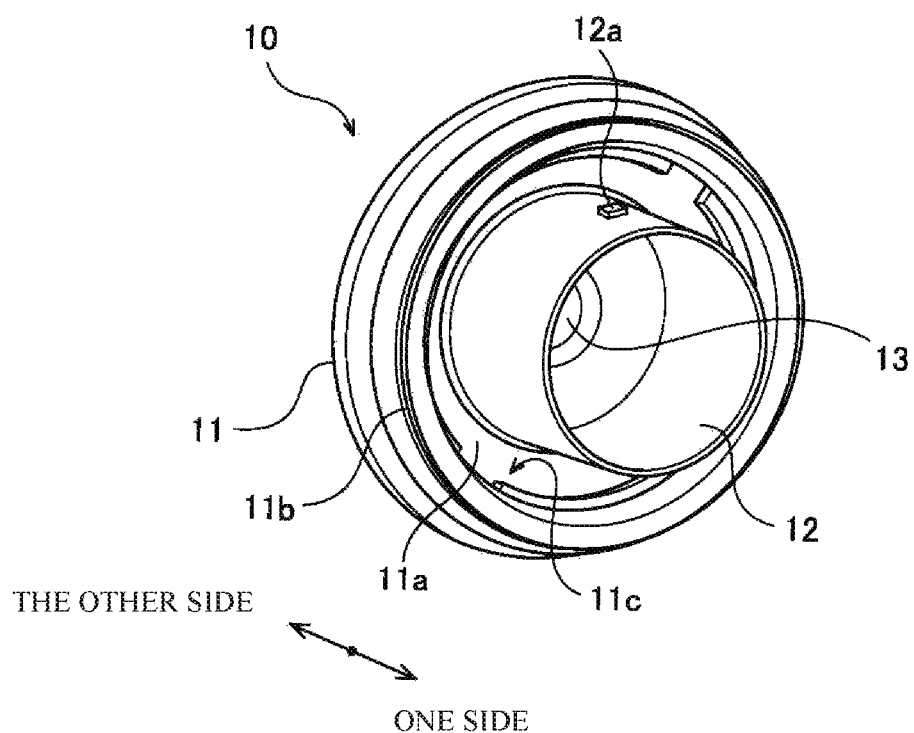
FIG. 2 is a perspective view of a grommet exterior in FIG. 1.
Figure 3:
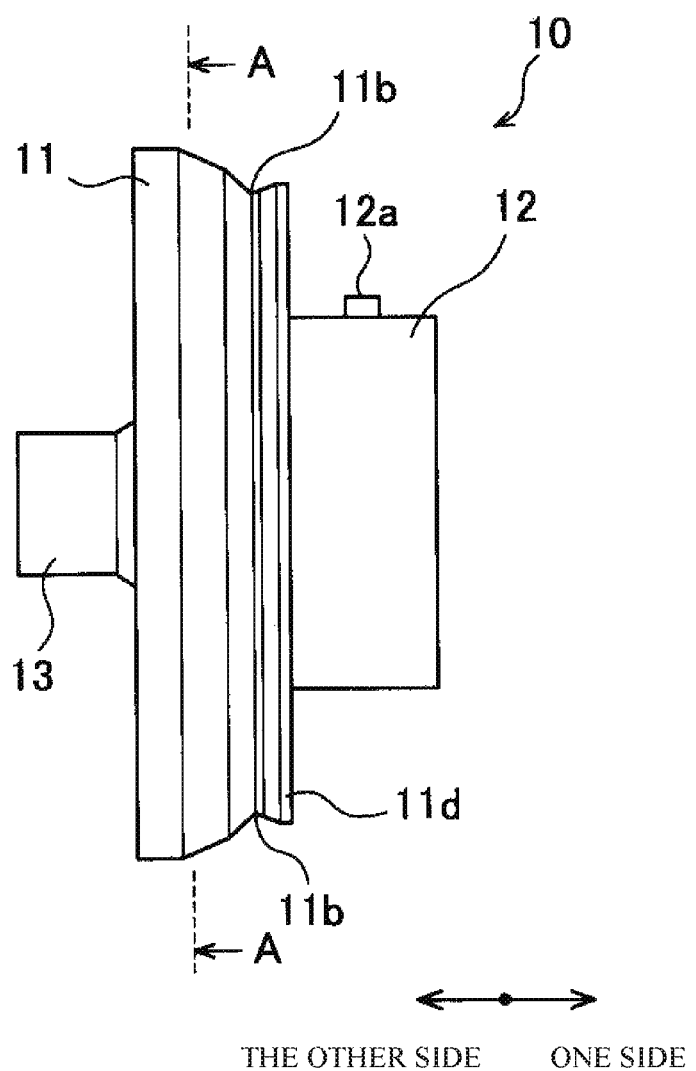
FIG. 3 is a side view of the grommet exterior.
Figure 4:
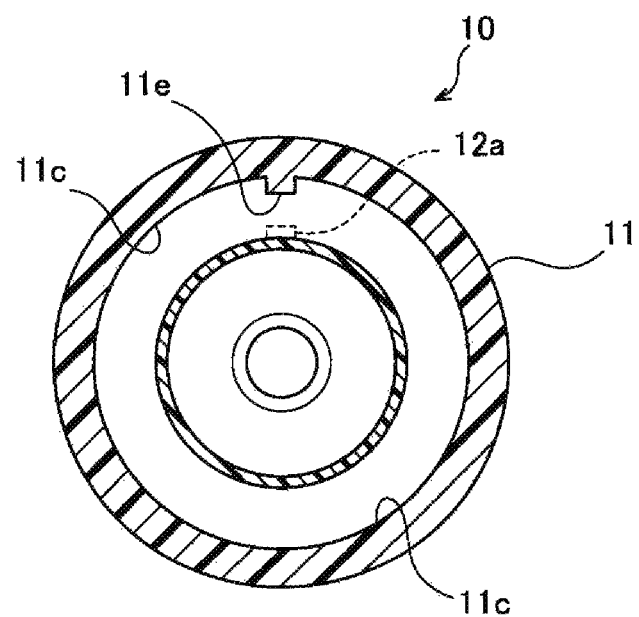
FIG. 4 is a cross-sectional view taken along a line A-A in FIG. 3.

FIG. 2 is a perspective view of the grommet exterior 10 in FIG. 1, FIG. 3 is a side view of the grommet exterior 10, and FIG. 4 is a cross-sectional view taken along a line A-A in FIG. 3. As illustrated in FIGS. 2 to 4, the grommet exterior 10 generally includes a large-diameter cylindrical portion 11, a first reduced-diameter cylindrical portion (reduced-diameter cylindrical portion) 12 extending on one side of the large-diameter cylindrical portion 11, and a second reduced-diameter cylindrical portion 13 extending on another side of the large-diameter cylindrical portion 11.

As illustrated in FIG. 2, the large-diameter cylindrical portion 11 includes a bottom surface 11a on the other side thereof. The large-diameter cylindrical portion 11 is a bottomed cylindrical portion with the one side open. As illustrated in FIG. 3, the large-diameter cylindrical portion 11 includes a throttle portion 11b having a slightly reduced diameter. The large-diameter cylindrical portion 11 includes a flange fitting groove 11c (see FIGS. 2 and 4) therein on the other side of the throttle portion 11b. The flange fitting groove 11c is a substantially annular (substantially circular) groove into which a flange (to be described below) of the grommet interior 20 is fitted.

The large-diameter cylindrical portion 11 includes, on the one side of the throttle portion 11b, a lip 11d having an increasing diameter toward the one side (see FIG. 3). The lip 11d has a larger diameter than that of the through hole TH in the panel P. As illustrated in FIG. 1, the lip 11d is pressed against the panel P to ensure water tightness when the grommet 1 is attached to the through hole TH. Further, as illustrated in FIG. 4, the flange fitting groove 11c of the large-diameter cylindrical portion 11 includes an anti-rotation rib 11e protruded toward inside of the large-diameter cylindrical portion 11.

As illustrated in FIGS. 2 and 3, the first reduced-diameter cylindrical portion 12 and the second reduced-diameter cylindrical portion 13 are cylindrical portions extending in opposite directions from the bottom surface 11a of the large-diameter cylindrical portion 11, and have smaller diameters than that of the large-diameter cylindrical portion 11. In the first embodiment, the first reduced-diameter cylindrical portion 12 has a larger diameter than that of the second reduced-diameter cylindrical portion 13. The first reduced-diameter cylindrical portion 12 includes a protrusion (mark portion) 12a on an outer surface of the first reduced-diameter cylindrical portion 12. Wire harnesses are inserted into the reduced-diameter cylindrical portions 12 and 13.

The protrusion 12a serves as a mark that indicates a position of the anti-rotation rib 11e. Here, the grommet exterior 10 according to the first embodiment includes the anti-rotation rib 11e inside the large-diameter cylindrical portion 11. Particularly, the large diameter tube portion 11 includes the throttle portion 11b. For this reason, it is difficult to check the position of the anti-rotation rib 11e. In the first embodiment, the protrusion 12a is provided at the same position as the anti-rotation rib 11e in a rotation direction as illustrated in FIG. 4. In the rotation direction here, an axis of the cylindrical portion 11 (or the first reduced-diameter cylindrical portion 12 and the second reduced-diameter cylindrical portion 13) serves as a center.

Therefore, an operator checks the position of the anti-rotation rib 11e by checking the position of the protrusion 12a on the outer surface of the first reduced-diameter cylindrical portion 12.

In the first embodiment, the protrusion 12a is provided at the same position as the anti-rotation rib 11e in the rotation direction. However, the protrusion 12a may be provided at a position rotated by 180° or by 90° to indicate the position of the anti-rotation rib 11e. That is, the position of the protrusion 12a may not be the same as the anti-rotation rib 11e in the rotation direction.

Further, the first embodiment describes the protrusion 12a as a mark portion. However, the mark portion is not limited thereto and may be a recess portion, an opening portion, or a colored portion. The colored portion, such as an arrow mark, preferably indicates the position of the anti-rotation rib 11e more clearly.

Figure 5:
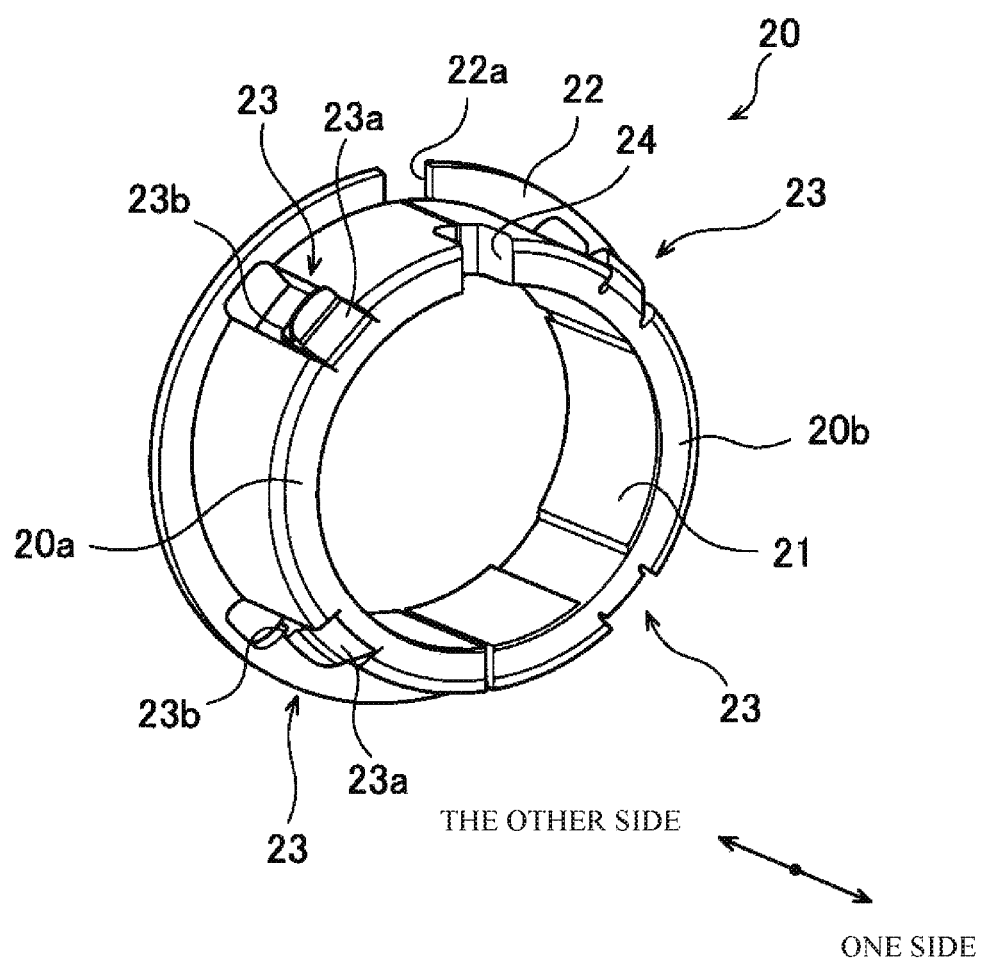
FIG. 5 is a perspective view of a grommet interior in FIG. 1.

FIG. 5 is a perspective view of a grommet interior 20 shown in FIG. 1. The grommet interior 20 is constituted by half bodies 20a and 20b obtained by dividing a cylindrical body by half in an axial direction. The grommet inner 20 is formed by assembling the half bodies 20a and 20b.

The grommet interior 20 includes a cylindrical portion 21 attached to the grommet exterior 10 in a manner of surrounding the first reduced-diameter cylindrical portion 12 (see FIG. 1). In the first embodiment, the first reduced-diameter cylindrical portion 12 is short. However, the actual first reduced-diameter cylindrical portion 12 is usually long, and insertion of the grommet interior 20 into such a long first reduced-diameter cylindrical portion 12 leads to reduction in workability. Accordingly, the grommet interior 20 is constituted by the half bodies 20a and 20b which are assembled near a base of the first reduced-diameter cylindrical portion 12.

The grommet interior 20, in which the half bodies 20a and 20b are assembled, includes four lock claws 23 at equal intervals in a circumferential direction of the grommet interior 20 (three of the four lock claws 23 are visible in FIG. 5). The lock claws 23 lock the grommet 1 in the through hole TH of the panel P (see FIG. 1). The grommet 1 is inserted into the one side of the through hole TH from the other side of the through hole TH in a state where the grommet exterior 10 and the grommet interior 20 are assembled. At this time, the lock claws 23 are elastically deformed when inclined portions 23a of the lock claws 23 are abutted against the through hole TH. When the inclined portions 23a pass through the through hole TH, the lock claws 23 elastically return to their original shapes and come into contact with locking step portions 23b. The grommet 1 is restricted from moving to the other side when being in contact with the locking step portions 23b. Additionally, the lip 11d restricts movement of the grommet 1 to the one side. That is, the grommet 1 is attached to the through hole TH of the panel P in a manner of being sandwiched between the locking step portions 23b of the locking claws 23 and the lip 11d.

A flange 22 projects outward from the cylindrical portion 21 on the other side (one end) of the cylindrical portion 21. The flange 22 is fitted into the flange fitting groove 11c when the grommet interior 20 is attached to the grommet exterior 10. The flange 22 has a substantially annular shape (substantially circular shape) similar to the flange fitting groove 11c. The flange 22 includes a notch portion 22a having a recess shape. The notch portion 22a is a part in which a portion of the flange 22 is hollowed out, to which the anti-rotation rib 11e is fitted when the grommet interior 20 is properly attached to the grommet exterior 10. In the first embodiment, the notch portion 22a extends over a connecting part of the half bodies 20a and 20b. That is, the half bodies 20a and 20b include L-shaped notches in the flange 22 respectively. The notch portion 22a having a recess shape is formed by combining the L-shaped notches.

In the first embodiment, the grommet interior 20 includes a recess portion 24 in the cylindrical portion 21. The recess portion 24 is hollowed out from one end portion of the cylindrical portion 21. The recess portion 24 also extends over a connecting part of the half bodies 20a and 20b in the same way as the notch portion 22a does. Therefore, the recess portion 24 is provided at the same position in the rotation direction as the notch portion 22a. As illustrated in FIG. 1, the protrusion 12a is fitted into the recess portion 24 when the grommet interior 20 is properly attached to the grommet exterior 10.

Figure 6:
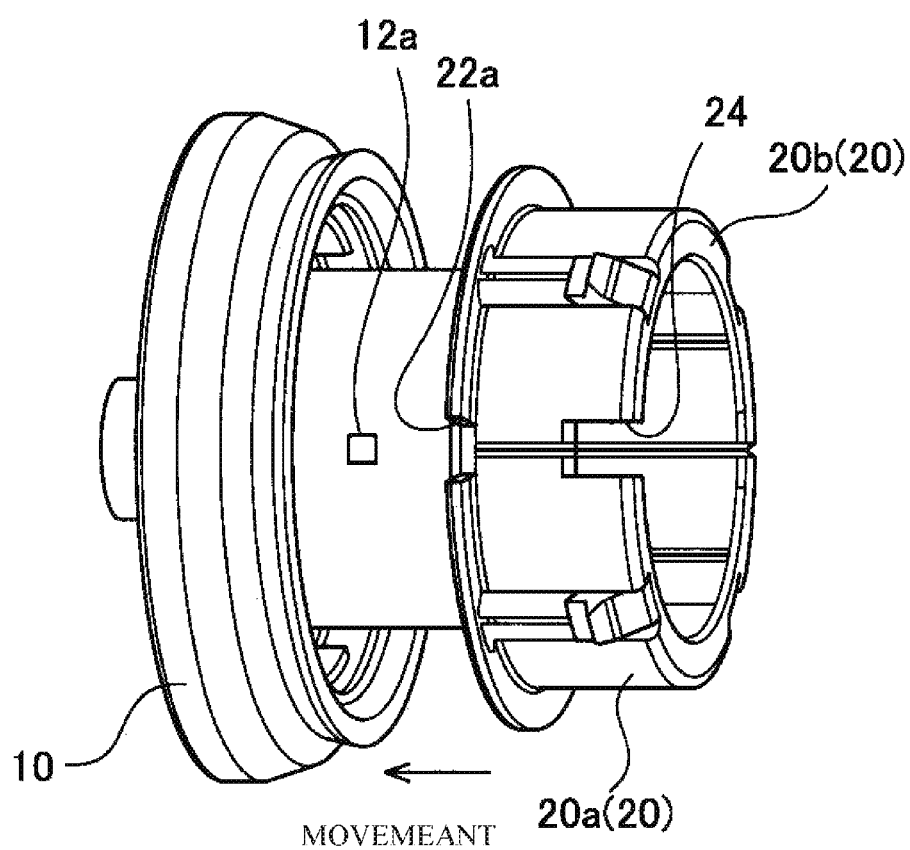
FIG. 6 is a perspective view illustrating a method of assembling the grommet exterior and the grommet interior according to the first embodiment.

Next, a method of assembling the grommet exterior 10 and the grommet interior 20 according to the first embodiment is described with reference to FIG. 6. FIG. 6 is a perspective view illustrating the method of assembling the grommet exterior 10 and the grommet interior 20 according to the first embodiment.

First, the operator prepares the half bodies 20a and 20b of the grommet interior 20 and assembles them in a manner that the first reduced-diameter cylindrical portion 12 is located inside. Then, the operator checks positions of the protrusion 12a and the recess portion 24. Thereafter, the operator moves the grommet interior 20 to the other side so that the protrusion 12a is fitted into the recess portion 24 (or that the notch portion 22a or the connecting part passes over the protrusion 12a).

Here, the protrusion 12a and the anti-rotation rib 11e are in the same position in the rotation direction (see FIG. 4). In the grommet interior 20, the notch portion 22a and the recess portion 24 are in the same position in the rotation direction. Therefore, by fitting the protrusion 12a into the recess portion 24, the operator assembles the grommet exterior 10 and the grommet interior 20 in a manner that the flange 22 is fitted into the flange fitting groove 11c and the notch portion 22a is assembled to coincide with the anti-rotation rib 11e.

In this way, according to the grommet 1 in the first embodiment, the first reduced-diameter cylindrical portion 12 includes the mark portion (protrusion 12a) on the outer surface thereof that indicates the position of the anti-rotation rib 11e. Therefore, even if the anti-rotation rib 11e is provided at a position such as inside of the large-diameter cylindrical portion 11 that is hardly seen, the mark portion is provided at a position that is easily recognized at a glance during attachment such as the outer surface of the first reduced-diameter cylindrical portion 12 in the grommet exterior 10 that serves as an attachment side of the grommet interior 20. Therefore, the notch portion 22a easily coincides with the anti-rotation rib 11e when the grommet interior 20 is attached to the grommet exterior 10 with reference to the mark portion.

Further, since the mark portion is provided at the same position as the anti-rotation rib 11e in the rotation direction, the grommet interior 20 may be attached to the grommet exterior 10 in a manner that the notch portion 22a of the flange 22 matches the mark portion, and the notch portion 22a coincides with the anti-rotation rib 11e more easily.

Since the mark portion is the protrusion 12a on the outer surface of the first reduced-diameter cylindrical portion 12 and the protrusion 12a is protruded outward from the first reduced-diameter cylindrical portion 12, visibility is enhanced as compared with, for example, a case where the mark portion is a colored portion or the like.

Further, since the cylindrical portion 21 of the grommet interior 20 includes the recess portion 24 into which the protrusion 12a is fitted, the grommet interior 20 may be attached to the grommet exterior 10 in a manner that the recess portion 24 matches the protrusion 12a, and the notch portion 22a coincides with the anti-rotation rib 11e more easily.

Next, a second embodiment of the present invention is described. A grommet according to the second embodiment has the following configuration. In the following description of the second embodiment, elements those are the same or similar as those in the first embodiment are denoted by the same reference numerals.

Figure 7:
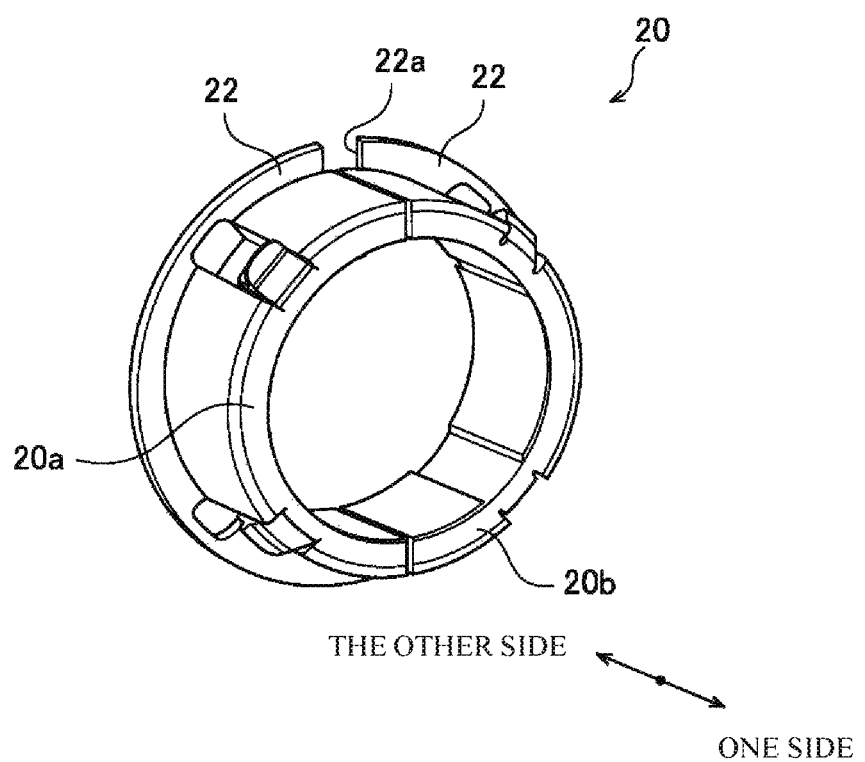
FIG. 7 is a perspective view illustrating a grommet interior according to a second embodiment.
Figure 8:
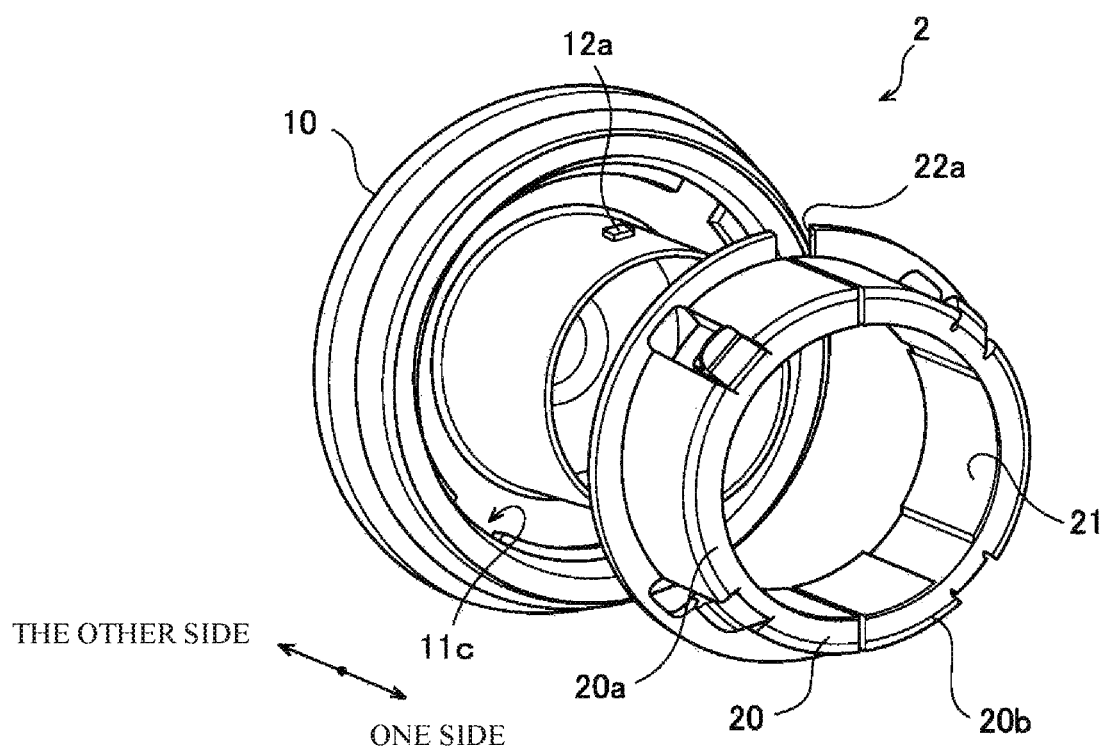
FIG. 8 is a perspective view illustrating a method of assembling a grommet exterior and the grommet interior according to the second embodiment.

FIG. 7 is a perspective view illustrating the grommet interior 20 according to the second embodiment, and FIG. 8 is a perspective view illustrating a method of assembling the grommet exterior 10 and the grommet interior 20 according to the second embodiment.

As illustrated in FIG. 7, the grommet interior 20 according to the second embodiment is similar to that in the first embodiment, except that the grommet interior 20 does not include the recess portion 24.

Therefore, an operator checks positions of the protrusion 12a and the notch portion 22a when the grommet interior 20 is attached to the grommet exterior 10 as illustrated in FIG. 8. Thereafter, the operator moves the grommet interior 20 to another side so that the notch portion 22a passes over the protrusion 12a (or that the connecting part passes over the protrusion 12a).

Here, the protrusion 12a and the anti-rotation rib 11e are in the same position in a rotation direction (see FIG. 4). Therefore, by assembling the grommet interior 20 in a manner that the notch portion 22a passes over the protrusion 12a, the operator assembles the grommet exterior 10 and the grommet interior 20 in a manner that the flange 22 is fitted into the flange fitting groove 11c and the notch portion 22a is assembled to coincide with the anti-rotation rib 11e.

The grommet interior 20 according to the second embodiment includes a thin portion (not illustrated) inside the cylindrical portion 21, and the protrusion 12a is fitted into the thin portion inside the cylindrical portion 21 when the grommet interior 20 is properly attached to the grommet exterior 10.

In this way, according to a grommet 2 according to the second embodiment, the notch portion 22a in the flange 22 coincides easily with the anti-rotation rib 11e inside the flange fitting groove 11c, which is similar as in the first embodiment. Further, visibility is enhanced as compared with, for example, a case where the mark portion is a colored portion or the like.

In the second embodiment, a connecting part of the half bodies 20a and 20b is in the same position as the notch portion 22a in the rotation direction. Therefore, the grommet interior 20 is not limited to a case of being assembled such that the notch portion 22a passes over the protrusion 12a, and may also be assembled such that the connecting part passes over the protrusion 12a.

The present invention is described based on the embodiments. However, the present invention is not limited to the above embodiments, and various modifications may be made without departing from the scope of the present invention. Furthermore, well-known and known techniques may be combined.

For example, the protrusion 12a is on one side of the grommet exterior 10 in the second embodiment, and may be exposed to one side of the cylindrical portion 21 when the grommet interior 20 is properly attached to the grommet exterior 10.

In the first embodiment, as illustrated in FIG. 1 and the like, the recess portion 24 has a shape in which one side is open. However, the present invention is not limited thereto, and the recess portion 24 may be a rectangular hole in which one side is not opened.

Further, in the first embodiment, as illustrated in FIG. 1, the protrusion 12a includes a relatively large gap and is fitted into the recess portion 24. However, the present invention is not limited thereto, and the protrusion 12a may be as illustrated in FIG. 9.

Figure 9:
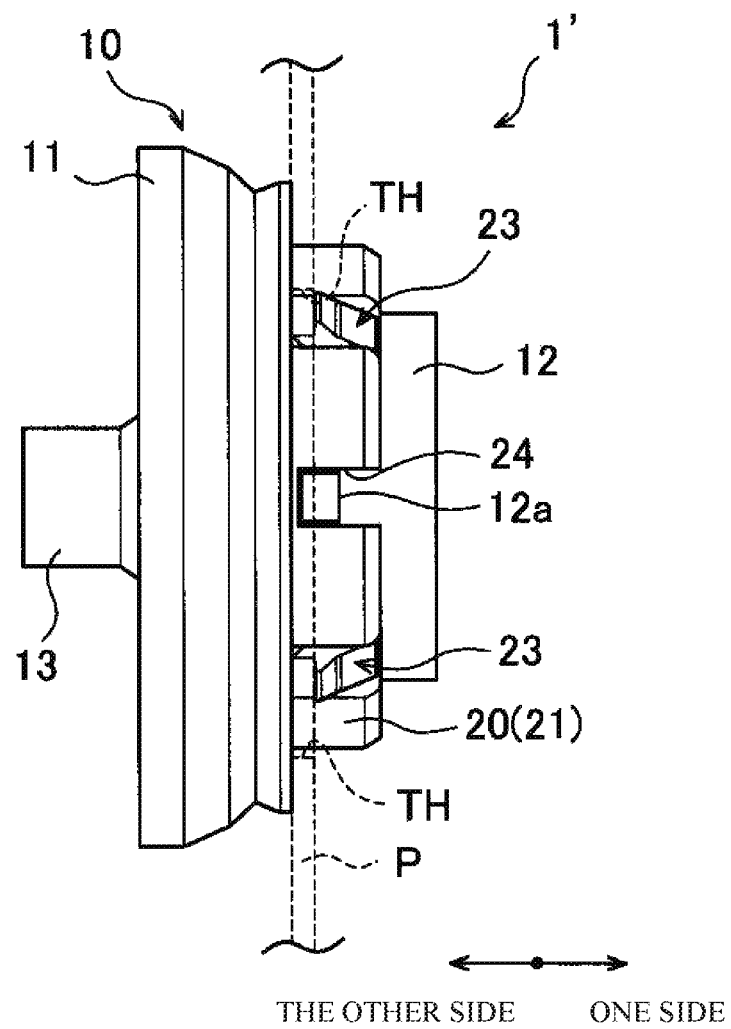
FIG. 9 is a side view illustrating a grommet according to a modification.

FIG. 9 is a side view illustrating a grommet 1' according to a modification. As illustrated in FIG. 9, in the grommet exterior 10 according to the modification, the protrusion 12a has an enlarged shape, and is fitted into the recess portion 24 substantially without a gap. That is, the protrusion 12a and the recess portion 24 have coinciding shapes both in a rotation direction and on a base side (another side) of the cylindrical portion 21.

Such shapes have following effects. First, it is possible to prevent a situation in which the grommet interior 20 is slightly displaced in the rotation direction due to a clearance therebetween and a situation in which the notch portion 22a and the anti-rotation rib 11e do not coincide although the protrusion 12a is fitted into the recess portion 24, since the protrusion 12a and the recess portion 24 coincide with each other in the rotation direction. Further, it is possible to prevent the flange 22 from being in a halfway attached state in which the flange 22 is not fitted into the flange fitting groove 11c, since the protrusion 12a and the recess portion 24 coincide with each other on the base side of the cylindrical portion 21. Therefore, the flange 22 can be fitted into the flange fitting groove 11c and the notch portion 22a can coincide with the anti-rotation rib 11e by matching the protrusion 12a and the recess portion 24.

What is claimed is:

1. A grommet comprising:
a grommet interior having a substantially annular flange; and
a grommet exterior having a substantially annular flange fitting groove, and attached to the grommet interior by fitting the flange into the flange fitting groove,
wherein the grommet exterior includes a large-diameter cylindrical portion in which the flange fitting groove is formed inside, an anti-rotation rib protruding from the flange fitting groove toward inside of the large-diameter cylindrical portion, and a reduced-diameter cylindrical portion that is provided on an attachment side of the grommet interior to the large-diameter cylindrical portion and that has a diameter smaller than that of the large-diameter cylindrical portion,
wherein the flange of the grommet interior is provided with a notch portion into which the anti-rotation rib is fitted, and
wherein the reduced-diameter cylindrical portion includes a mark portion that indicates a position of the anti-rotation rib on an outer surface of the reduced-diameter cylindrical portion.

2. The grommet according to claim 1,
wherein the mark portion is provided at a same position as the anti-rotation rib in a rotation direction in which an axis of the large-diameter cylindrical portion serves as a center.

3. The grommet according to claim 1,
wherein the mark portion is a protrusion on the outer surface of the reduced-diameter cylindrical portion.

4. The grommet according to claim 3,
wherein the grommet interior includes a cylindrical portion provided with the flange at one end thereof and surrounding the reduced-diameter cylindrical portion, and
wherein the cylindrical portion includes a recess portion into which the protrusion is fitted.

5. The grommet according to claim 4,
wherein the protrusion and the recess portion have coinciding shapes both in the rotation direction, in which the axis of the large-diameter cylindrical portion serves as a center, and on a base side of the cylindrical portion when the flange is fitted into the flange fitting groove and the notch portion coincides with the anti-rotation rib.

\* \* \* \* \*